United States Patent [19]

Tsukuda et al.

[11] Patent Number: 5,686,166
[45] Date of Patent: Nov. 11, 1997

[54] MAGNETIC RECORDING MEDIUM HAVING SPECIFIED BASE FILM SURFACE CHARACTERISTICS

[75] Inventors: Akimitsu Tsukuda, Kyoto; Kazumasa Yoneyama; Nobuaki Ito, both of Otsu, all of Japan

[73] Assignee: Toray Industries, Inc., Japan

[21] Appl. No.: 586,738

[22] PCT Filed: Jun. 21, 1995

[86] PCT No.: PCT/JP95/01247

§ 371 Date: Feb. 12, 1996

§ 102(e) Date: Feb. 12, 1996

[87] PCT Pub. No.: WO96/00439

PCT Pub. Date: Jan. 4, 1996

[30] Foreign Application Priority Data

Jun. 23, 1994 [JP] Japan ................. 6-141814
Jul. 4, 1994 [JP] Japan ................. 6-152360

[51] Int. Cl.$^6$ .................................. G11B 5/704
[52] U.S. Cl. ............... 428/141; 428/212; 428/473.5; 428/474.4; 428/694 SG; 428/900; 360/134; 360/135
[58] Field of Search ............... 428/141, 212, 428/473.5, 474.4, 694 SG, 900; 360/134, 135

[56] References Cited

U.S. PATENT DOCUMENTS

| | | | |
|---|---|---|---|
| 3,966,686 | 6/1976 | Asakura et al. | 260/78 |
| 4,645,702 | 2/1987 | Asakura et al. | 428/141 |
| 4,910,068 | 3/1990 | Takagi et al. | 428/141 |

FOREIGN PATENT DOCUMENTS

| | | |
|---|---|---|
| 0 277 783 A2 | 8/1988 | European Pat. Off. |
| 62-248131 | 10/1987 | Japan. |
| 1-053330 | 3/1989 | Japan. |
| A-03 0214477 | 1/1991 | Japan. |
| 6-195679 | 7/1994 | Japan. |

*Primary Examiner*—Stevan A. Resan
*Attorney, Agent, or Firm*—Austin R. Miller

[57] ABSTRACT

The present invention relates to a magnetic recording medium including a base film made of an aromatic polyamide or an aromatic polyimide, and a magnetic recording layer formed on one surface of the base film, the number of large protrusions H2 on the surface of the base film on which the magnetic layer is to be formed and the number of large protrusions H3 on the surface of the side of the base film opposite to the surface on which the magnetic layer is to be formed satisfying the relationships of:

$$H2 \leq 50$$

$$2 \leq H3 \leq 100,$$

the tensile Young's modulus E20 at 20° C. in at least one direction and the tensile Young's modulus E100 at 100° C. in the same direction satisfying the relationships of:

$$E20 \geq 800 \text{ kg/mm}^2$$

$$0.5 \leq E100/E20.$$

The present invention provides a magnetic recording medium having excellent durability, running property and output characteristics even under severe conditions at high temperature.

7 Claims, No Drawings

MAGNETIC RECORDING MEDIUM HAVING SPECIFIED BASE FILM SURFACE CHARACTERISTICS

TECHNICAL FIELD

The present invention relates to a magnetic recording medium, particularly, a magnetic recording medium having excellent running property, durability and output characteristics.

BACKGROUND ART

Recently, video cameras are more and more often used outdoors. Further, there is a demand to make the size of the video camera small and to prolong the recordable time. Still further, there is a demand to use magnetic recording media as external memory of computers. Thus, a high density magnetic recording medium having a small thickness, which has excellent durability, excellent running property and output characteristics under severe conditions, is demanded.

Magnetic recording media comprising a polyester film and a magnetic layer formed thereon by coating a ferromagnetic or metal powder are known (e.g., Japanese Laid-open Patent Application (Kokai) Nos. 61-26933 (1986) and 60-66319 (1985)). Japanese Laid-open Patent Application (Kokai) No. 62-62424 (1987) discloses a magnetic recording medium comprising an aromatic polyamide film having different Young's moduli in the longitudinal and transverse directions.

However, the above-mentioned magnetic recording media based on a polyester film or an aromatic polyamide film have drawbacks in that although there are no problems when they are used under normal temperature, their running properties and output characteristics are poor and drop out occurs when they are used at high temperatures. This is because the heat resistance of the base film is not sufficient or the surface properties and running property of the base film are not satisfactory.

An example wherein conditions of surface large protrusions of a non-magnetic material are defined is described in Japanese Laid-open Patent Application (Kokai) No. 6-195679 (1994), in which the number of large protrusions H2 on the back coat side of the film is defined as $H2 \leq 50$ protrusions/100 cm$^2$. Japanese Laid-open Patent Application (Kokai) No. 63-146941 (1988) discloses an example wherein $H2 \leq 100$ protrusions/25 cm$^2$ and Japanese Laid-open Patent Application (Kokai) No. 59-203232 (1984) discloses an example wherein (H3-H2)$\leq$200 protrusions/mm$^2$.

However, with the film disclosed in Japanese Laid-open Patent Application (Kokai) No. 6-195679 (1994), although the number of large protrusions on the back coat side of the film is defined, the number of large protrusions on the side on which the magnetic layer is to be formed is not defined, so that the magnetic medium does not attain sufficient output characteristics and running property. With the magnetic recording media disclosed in Japanese Laid-open Patent Application (Kokai) Nos. 63-146941 (1988) and 59-203232 (1984), the base film is restricted to polyester films and the number of large protrusions is large, so that they have drawbacks in that the running properties and output characteristics are poor when they are used at high temperatures.

A magnetic recording medium employing a base in which the ratio of the Young's modulus at 90° C. E90 to the Young's modulus at room temperature ERT is adjusted within the range of $1.0 \geq E90/ERT \geq 0.6$ is disclosed in Japanese Laid-open Patent Application (Kokai) No. 64-53330 (1989). However, the number of protrusions on the surface of the base is not defined, so that sufficient output characteristics as a high density magnetic recording medium cannot be obtained.

An aramide film having a dimensional change under a load of 1 kg/mm$^2$ at 200° C. for 5 minutes is not more than 5% is shown in Japanese Laid-open Patent Application (Kokai) No. 63-28695 (1988). However, this film contains 10–40% of carbon black and its use is for image transfer material for thermal recording film, so that its object is largely different from that of the present invention.

The present inventors intensively studied the cause of these drawbacks to discover that the cause of the drawbacks resides in the heat resistance of the base film and in the number of large protrusions on the surface of the side on which the magnetic recording layer is to be formed and on the surface of the other side of the base film, thereby reaching to the present invention.

DISCLOSURE OF THE INVENTION

An object of the present invention is to overcome these problems and to provide a magnetic recording medium having excellent running property, durability and output characteristics even under severe conditions such as high temperature and repeated running, by exploiting the excellent heat resistance and high rigidity of aromatic polyamides or aromatic polyimides and by defining the surface characteristics.

That is, the present invention provides a magnetic recording medium comprising a base film made of an aromatic polyamide or an aromatic polyimide, and a magnetic layer formed on one surface of the base film, the number of surface large protrusions H2 on the surface of the base film on which the magnetic layer is to be formed and the number of surface large protrusions H3 on the surface of the side of the base film opposite to the surface on which the magnetic layer is to be formed satisfying the relationships of:

$$H2 \leq 50$$

$$2 \leq H3 \leq 100,$$

the tensile Young's modulus E20 at 20° C. in at least one direction and the tensile Young's modulus E100 at 100° C. in the same direction satisfying the relationships of:

$$E20 \geq 800 \text{ kg/mm}^2$$

$$0.5 \leq E100/E20.$$

BEST MODE FOR CARRYING OUT THE INVENTION

The aromatic polyamide used in the present invention contains the repeating units expressed by the formula (I) and/or (II) preferably in an amount of not less than 50 mol %, more preferably not less than 70 mol %.

Formula (I)
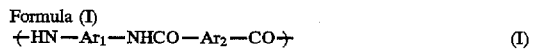
(I)

Formula (II)
(II)

wherein $Ar_1$, $Ar_2$ and $Ar_3$ represent, for example,

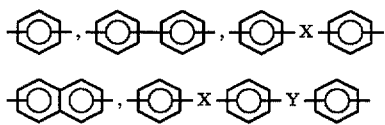

wherein X and Y represent —O—, —CH$_2$—, —CO—, —SO$_2$—, —S—, —C(CH$_3$)$_2$— or the like, although $Ar_1$, $Ar_2$ and $Ar_3$ are not restricted to those described above. Further, the aromatic polyamides mentioned above in which a part of the hydrogen atoms on the aromatic rings are substituted with a halogen (especially chlorine); nitro group; $C_1$–$C_3$ alkyl group (especially methyl); $C_1$–$C_3$ alkoxy group; and in which at least a part of the hydrogen atoms in the amide bonds in the polymer are substituted with a substituent, may also be employed in the present invention.

The aromatic polyamide preferably contains para-aromatic amide units in an amount of not less than 50%, more preferably not less than 75% because the stiffness and heat resistance of the film is good. From the view point of making the moisture absorption small, it is preferred that aromatic amide units in which a part of the hydrogen atoms on the aromatic ring are substituted with halogens (especially chlorine) be contained in an amount of not less than 30% based on the total aromatic polyamide.

The aromatic polyamide which may be used in the present invention contains the repeating unit represented by the above-described formula (I) and/or formula (II) in an amount of not less than 50 mol %. The remaining less than 50 mol % may be other repeating units copolymerized or blended with the aromatic amide units.

The aromatic polyimide used in the present invention contains the repeating units expressed by the formula (III) and/or (IV) preferably in an amount of not less than 50 mol %, more preferably not less than 70 mol %.

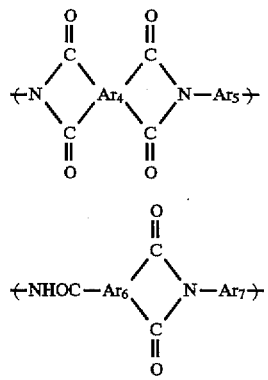

In these formulae, $Ar_4$ and $Ar_6$ contain at least one aromatic ring, respectively, and the two carbonyl groups are bonded to juxtaposed carbon atoms in the aromatic ring. $Ar_4$ is originated from an aromatic tetracarboxylic acid or anhydride thereof. Representative examples of $Ar_4$ include the following:

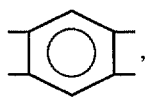

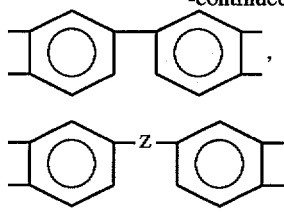

wherein Z is selected from the group consisting of —O—, —CH$_2$—, —CO—, —SO$_2$—, —S—, —C(CH$_3$)$_2$— and the like.

$Ar_6$ is originated from a carboxylic acid anhydride or a halide thereof. Examples of $Ar_5$ and $Ar_7$ include

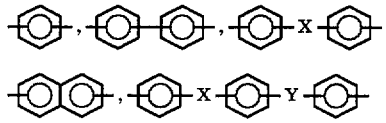

wherein X and Y are selected from the group consisting of —O—, —CH$_2$—, —CO—, —SO$_2$—, —S—, —C(CH$_3$)$_2$— and the like, although X and Y are not restricted thereto. Further, the aromatic groups described above in which a part of the hydrogen atoms on the aromatic rings are substituted with a halogen (especially chlorine); nitro group; $C_1$–$C_3$ alkyl group (especially methyl); $C_1$–$C_3$ alkoxy group; and in which at least a part of the hydrogen atoms in the amide bonds in the polymer are substituted with a substituent, may also be employed in the present invention.

The aromatic polyimide which may be used in the present invention contains the repeating unit represented by the above-described formula (III) and/or formula (IV) in an amount of not less than 50 mol %. The remaining less than 50 mol % may be other repeating units copolymerized or blended with the aromatic imide units.

Further, additives such as lubricants, anti-oxidants and the like may be contained in the aromatic polyamide or in the aromatic polyimide in an amount not adversely affecting the physical properties of the film.

In the magnetic recording medium according to the present invention, it is required that the number of surface large protrusions H2 on the surface of the base film on which the magnetic layer is to be formed satisfy the relationship of:

$$H2 \leq 50,$$

more preferably $H2 \leq 30$, still more preferably $H2 \leq 20$. If H2 is larger than 50, the surface characteristics of the resulting magnetic recording medium are deteriorated and drop out occurs, so that it is not suited as a high density magnetic recording medium.

It is required that the number of surface large protrusions H3 on the surface of the base film of the side opposite to the side on which the magnetic layer is to be formed satisfy the relationship of:

$$2 \leq H3 \leq 100,$$

more preferably $2 \leq H3 \leq 70$, still more preferably $2 \leq H3 \leq 50$. If H3 is less than 2, the contact resistance between the resulting magnetic recording medium and guide rolls or the like is large, so that its running property is poor. On the other hand, if H3 is more than 100, large protrusions may be transcribed to the magnetic layer when the film is made into magnetic tapes, and the large protrusions may influence the surface characteristics of the magnetic layer in the calender step in the coating process in the production of coating type magnetic recording media, so that the large protrusions may cause drop out, which is not preferred.

In the magnetic recording medium according to the present invention, it is preferred that the number of surface large protrusions H1 on the surface of the base film on which the magnetic layer is to be formed satisfy the relationship of:

$$H1 \leq 100,$$

more preferably $H1 \leq 70$, still more preferably $H1 \leq 50$, because excellent electro-magnetic conversion characteristics are attained.

Further, in the magnetic recording medium according to the present invention, it is required that the tensile Young's modulus E20 of the base film at 20° C. in at least one direction satisfy the relationship of:

$$E20 \geq 800 \text{ kg/mm}^2,$$

more preferably $E20 \geq 900$ kg/mm$^2$, still more preferably $E20 \geq 1000$ kg/mm$^2$. Since the magnetic recording medium according to the present invention is often used in the form of a thin film in response to the demand of making the magnetic recording medium thin, it is necessary that the medium have a high Young's modulus ($E20 \geq 800$ kg/mm$^2$) in order to withstand the tension exerted during running of the tape and at the time of starting and stopping. If the Young's modulus is lower than 800 kg/mm$^2$, the tape is elongated, so that recording/regenerating properties are deteriorated. The fact that the base film has a high Young's modulus ($E20 \geq 800$ kg/mm$^2$) is also advantageous in processing of the magnetic recording medium because it can withstand the tension exerted during the production of the magnetic recording medium such as in the step of forming the coating layer and the back coat layer.

As long as the tensile Young's modulus E20 of the base film in at least one direction at 20° C. is not less than 800 kg/mm$^2$, the base film of the magnetic recording medium according to the present invention may be more strengthened in the longitudinal direction, transverse direction or in a slant direction. Usually, the base film is more strengthened in the longitudinal or transverse direction. Although the degree of strengthening is not restricted, in view of the properties such as elongation and tear resistance, it is practical that tensile Young's modulus in the longitudinal direction $E_{MD}$ and tensile Young's modulus in the transverse direction $E_{TD}$ satisfy the following relationship:

$$0.5 \leq E_{MD}/E_{TD} \leq 2.$$

In addition, in the magnetic recording medium according to the present invention, it is required that the tensile Young's modulus E20 of the base film at 20° C. in at lease one direction and the tensile Young's modulus E100 thereof at 100° C. in the same direction satisfy the relationship of:

$$0.5 \leq E100/E20,$$

more preferably $0.6 \leq E100/E20$, still more preferably $0.7 \leq E100/E20$. If E100/E20 is less than 0.5, heat elongation due to reduction of rigidity of the tape occurs when the tape is used at high temperature, so that recording/regeneration properties are deteriorated. The fact that the reduction of Young's modulus at high temperature is small ($0.5 \leq E100/E20$) is also advantageous in processing of the magnetic recording medium because dimensional change of the tape during the drying step after coating the magnetic layer in the production of coating type magnetic recording media or in the step of forming a thin metal layer in the production of metal evaporated type magnetic recording media.

In the magnetic recording medium according to the present invention, the dimensional change of the base film in the longitudinal direction after applying a load of 1 kg per 1 mm$^2$ at 100° C. for 10 minutes is preferably not more than 2%, more preferably not more than 1.5%, still more preferably not more than 1.0%. In response to the demand of making the magnetic recording medium thin, the magnetic recording medium according to the present invention will be often used in the form of a thin film. Thus, if the dimensional change is not more than 2%, elongation or shrinkage of the tape caused by tension exerted during running of the tape at the time of starting or stopping is reduced when the tape is used at high temperature, so that recording/regeneration properties are improved. Further, the fact that the base film has a high dimensional stability (not more than 2%) to external force is also advantageous in processing of the magnetic recording medium because dimensional changes in the tape during the drying step after coating the layer in the production of coating type magnetic recording media or in the step of forming a thin metal layer in the production of metal evaporated type magnetic recording media.

The magnetic recording medium according to the present invention comprises the above-described base film and a magnetic layer formed on one surface of the base film.

Methods for forming the magnetic layer include wet processes in which a magnetic coating composition prepared by mixing ferromagnetic powder with a binder is applied to the base film; and dry processes such as vapor-deposition process, sputtering process, ion-plating process and the like. Although the method for forming the magnetic layer is not restricted, a wet process will now be described as an example.

The type of the magnetic powder for forming the magnetic layer is not restricted and ferromagnetic powder such as powder of ferric oxide, chromium oxide, Fe, Co, Fe—Co, Fe—Co—Ni, Co—Ni or the like may preferably be employed.

The magnetic powder can be formulated into a magnetic coating composition by mixing the powder with one or more of various binders. As the binder, thermosetting resin-based binders and radiant beam setting resin-based binders are preferred. Dispersing agents, lubricants and anti-static agents, etc. may also be used. For example, a binder comprising vinyl chloride/vinyl acetate/vinyl alcohol copolymers, polyurethane prepolymers and isocyanate may be used.

To give appropriate surface roughness to the magnetic recording medium according to the present invention, it is preferred to add particles in the base film. Examples of the particles which may be added to the base film include inorganic particles such as particles of $SiO_2$, $TiO_2$, $Al_2O_3$, $CaSO_4$, $BaSO_4$, $CaCO_3$, carbon black, zeolite and metals; and organic particles such as silicone particles, polyimide particles, cross-linked copolymer particles, cross-linked polyester particles and Teflon particles. The average primary particle size of the particles contained in the film according to the present invention is preferably 0.005–5 μm, more preferably 0.01–2 μm because both the electro-magnetic conversion characteristics and running property are good. The content of the particles contained in the base film of the magnetic recording medium according to the present invention is 0.01–5 wt. %, preferably 0.05–3 wt. %. If the content of the particles is less than the above-mentioned range, the running property of the film is poor, and if the content of the particles is more than the above-mentioned range, electromagnetic conversion characteristics tend to be poor.

The base film of the magnetic recording medium according to the present invention may be a monolayered film or a laminated film. In cases where the base film is a laminated film, the laminated film is preferably constructed such that the surface on which the magnetic recording layer is to be formed is the surface in which the number of surface large protrusions H2 satisfies the relationship of H2≦50, and that the surface in which the number of surface large protrusions H3 satisfies the relationship of 2≦H3≦100 is exposed at the side opposite to the surface on which the magnetic layer is to be formed, because both running property and electromagnetic conversion characteristics are good. In the laminated film, the base film of the magnetic recording medium according to the present invention and the substrate portion (i.e., the constituent of the laminate film other than the base film of the present invention) may be made of the same material or not. Particles may be contained in at least one layer constituting the substrate portion. In this case, preferred type of the particles, preferred average primary particle size of the particles and preferred content of the particles may be the same as described above for the base film according to the present invention. The particle size of the particles contained in the substrate portion may preferably be larger than that of the particles contained in the laminated base film of the present invention because an appropriate undulation may be given to the surface of the base film, so that the running property is further improved.

The thickness of the base film of the magnetic recording medium according to the present invention is preferably 0.5-50 μm, more preferably 1-20 μm, still more preferably 2-10 μm, because excellent running property and electromagnetic conversion property as a magnetic recording medium having a small thickness, which are the effects of the present invention, are obtained.

The elongation in at least one direction of the base film of the magnetic recording medium according to the present invention is preferably not less than 10%, less preferably not less than 20%, still more preferably not less than 30% because the tape has an appropriate flexibility.

The moisture absorption of the base film of the magnetic recording medium according to the present invention is preferably not more than 5%, more preferably not more than 3%, still more preferably not more than 2%, because the dimensional change of the tape due to fluctuation in humidity is small so that good electro-magnetic conversion property may be kept.

In cases where a laminate film is employed, it is preferred that these characteristics be satisfied in the laminate film.

A process for producing the magnetic recording medium according to the present invention will now be described. It should be noted, however, that the process for producing the magnetic recording medium is not restricted thereto.

In cases where the aromatic polyamide is prepared from an acid chloride and a diamine, the aromatic polyamide may be synthesized by solution polymerization in an aprotic organic polar solvent such as N-methylpyrrolidone (NMP), dimethylacetamide (DMAc) or dimethylformamide (DMF), or by interfacial polymerization in an aqueous medium. If an acid chloride and a diamine are used as monomers, hydrogen chloride is produced as a by-product. In cases where the generated hydrogen chloride is neutralized, an inorganic neutralizing agent such as calcium hydroxide, calcium carbonate or lithium carbonate; or an organic neutralizing agent such as ethylene oxide, propylene oxide, ammonia, triethylamine, triethanolamine or diethanolamine may be used. The reaction between an isocyanate and a carboxylic acid is carried out in an aprotic organic polar solvent in the presence of a catalyst.

The polymer solution may be used as the film-forming solution as it is. Alternatively, the polymer is separated from the solution and the polymer is dissolved again in the above-mentioned organic solvent or in an inorganic solvent such as sulfuric acid to form a film-forming solution.

To obtain the aromatic polyamide film according to the present invention, the intrinsic viscosity of the polymer (the value obtained by measuring the viscosity of the solution containing 0.5 g of the polymer in 100 ml of sulfuric acid at 30° C.) is preferably not less than 0.5.

To the film-forming solution, as a solubilizer, an inorganic salt such as calcium chloride, magnesium chloride, lithium chloride, lithium nitrate or the like may be added. The concentration of the polymer in the film-forming solution is preferably about 2–40% by weight.

On the other hand, a solution of the aromatic polyimide or polyamic acid can be obtained as follows. That is, polyamide acid can be prepared by reacting a tetracarboxylic acid dianhydride with an aromatic diamine in an aprotic organic polar solvent such as N-methylpyrrolidone (NMP), dimethylacetamide (DMAc) or dimethylformamide (DMF). The aromatic polyimide may be prepared by heating the above-described solution of polyamic acid, or by adding an imiding agent such as pyridine to obtain a powder of polyimide and then dissolving the powder in a solvent. The concentration of the polymer in the film-forming composition is preferably about 5–40 wt. %.

The particles may be added by throughly mixing the particles with a solvent to form a slurry and using the obtained slurry as a solvent for polymerization or for dilution; or the particles may be directly added to the film-forming solution after preparing the film-forming solution.

The film-forming solution prepared as described above is subjected to the so called solution casting process so as to form a film. The solution casting process includes dry/wet processes, dry processes and wet processes. Although the film may be formed by any of these processes, a dry/wet process will now be described as an example.

In cases where the film is prepared by a dry/wet method, the film-forming solution is extruded from a die onto a support such as a drum or an endless belt to form a thin film. The thin film layer is then dried to evaporate the solvent until the thin film acquires self-supporting property. The drying may be carried out at room temperature to 220° C. for not more than 60 minutes, more preferably at room temperature to 200° C. If the drying temperature is higher than 220° C., the number of surface large protrusions H2 may be increased to outside the range defined in the present invention. By controlling the frequency of surface defects of the drum or endless belt used in this drying step, H3 can be controlled within the range defined in the present invention. Preferably, the frequency of surface defects having diameters of not less than 30 μm is preferably 0.001–0.02 defects/mm$^2$, more preferably 0.002–0.015 defects/mm$^2$.

The film after the above-mentioned dry process is peeled off from the support and subjected to a wet process in which the solvent and impurities contained in the film are removed. The bath is usually an aqueous bath which may contain an organic solvent, inorganic salt or the like in addition to water. However, the bath usually contains water in an amount of not less than 30%, more preferably not less than 50%, and the bath temperature is usually 0°–100° C. Further, to decrease the impurities in the film, it is effective to raise the bath temperature to 50° C. or higher, or to pass the film through a bath of an organic solvent in addition to the aqueous bath. As the organic solvent, halogenated hydrocarbons such as chloroform, methylene chloride, "Freon"; and other organic solvents such as alcohols, ketones and ethers may be employed. In the wet process, the film peeled off from the above-mentioned support is immersed under tension in the above-mentioned one or more baths, thereby extracting the impurities in the film to a content of not more than 0.5%, preferably not more than 0.2%, still more preferably not more than 0.1%.

The film after the wet process is then stretched, dried and heat set to prepare a final film.

The film is stretched during the film-forming process so as to attain the mechanical characteristics within the ranges defined in the present invention. The area stretching ratio (the value obtained by dividing the area of the film after stretching by the area of the film before stretching. The area stretching ratio not more than 1 means relaxing) is preferably 0.8–8.0, more preferably 1.1–5.0. It is effective to slowly cool the film after the stretching or the heat set at a rate of not more than 100° C./second.

The film according to the present invention may be a laminate film. For example, when the film is a bilayered film, the polymerized aromatic polyamide solution is halved and different particles are added to the halved portions, respectively, and the resultants are laminated. Laminate films having three or more layers may be prepared in the similar manner. Lamination of the films can be carried out by well-known methods including methods in which the polymers are laminated in a die, methods in which the polymers are laminated in a feed block, and methods in which one layer is first prepared and other layer(s) is(are) laminated thereon.

Then a magnetic layer is formed on the film. The magnetic layer may be formed by any of the above-mentioned wet processes and dry processes. For example, in cases where the magnetic layer is formed by a wet process, although the magnetic layer may be coated by any of the known methods, the method using a gravure roll is preferred in view of the uniformity of the coated layer. The drying temperature after coating is preferably 90°–150° C. A calender process may preferably be carried out at 25° C. to 150° C.

Thereafter, to further promote the running property, a back coat layer may be formed on the surface of the base film opposite to the magnetic layer by a known method.

After curing the film coated with the magnetic layer, the film is slit to obtain the magnetic recording medium according to the present invention. The magnetic recording medium may be used, for example, as 8 mm tapes for personal or professional use; as D-1,2,3 for broadcasting use; and 8 mm tapes of DDS-2, 3, 4 and QIC for data-storing use, although the uses of the medium are not restricted thereto.

The methods for measuring and evaluating characteristics relating to the present invention will now be described.

(1) Number of Surface Large Protrusions (H1, H2, H3)

With a stereoscopic microscope under polarized light, 100 cm$^2$ area of film surface is observed and foreign matters are marked. The heights of the marked foreign matters are determined based on the number of rings of the interference fringe observed with a multiple interference meter. The number of protrusions giving not less than single-ply rings is defined as H1, the number of protrusions giving not less than two-ply rings is defined as H2, and the number of protrusions giving not less than three-ply rings is defined as H3.

(2) Tensile Young's Modulus

Tensile Young's modulus was measured using an instron type tensile tester. The width of the test sample was 10 mm, the gauge length was 50 mm, and the stretching rate was 300 mm/min. The measuring temperatures were 20° C. and 100° C.

(3) Dimensional Change

Label lines are drawn on the film at intervals of 150 mm. The film is then slit to a width of 10 mm to obtain a test sample. The thickness of the test sample is measured with a micrometer and a weight is attached to the sample such that the load is 1 kg/mm$^2$. Under these conditions, the sample is heated in an oven at 100° C. for 10 minutes and the dimensional change is calculated according to the following relationship.

$$\text{Dimensional Change (\%)} = \frac{|A - B|}{A} \times 100$$

(wherein A means the gauge length before heating and B means the gauge length after heating)

(4) Electro-magnetic Conversion Characteristics

A film on which a magnetic layer was coated was slit into a width of ½ inch and was mounted in a VTR cassette to obtain a VTR tape. This tape was set in a domestic VTR and Chroma S/N was measured by a color video noise measuring apparatus using 100% Chroma signal generated by a television test wave generator. Using a commercially available tape as a standard, those which showed higher S/N than the standard are marked "○", and those which showed lower S/N than the standard are marked "X".

(5) Running Property

A film was slit into the form of a tape having a width of ½ inch. The tape was made to run at 40° C., 80%RH using a tape running tester SFT-700 Model (manufactured by Yokohama System Kenkyujo), and the friction coefficient in the 50th pass was determined according to the following relationship:

$$\mu K = 0.733 \log(T2/T1)$$

wherein T1 means the tension at the entrance side and T2 means the tension at the exit side. The diameter of the guide was 6 mm, the material constituting the guide was polyoxymethylene (having a surface roughness of about 20–40 nm), the winding angle was 90°, the running speed was 3.3 cm/second and the repeating stroke was 15 cm. In cases wherein the μK determined by this measurement was not more than 0.35, the running property was ranked "○", and in cases where the μK was more than 0.35, the running property was ranked "X". This μK is the critical point which determines the ease of handling of the film when the film is processed into a magnetic recording medium, capacitor, wrapping film or the like.

EXAMPLE

The present invention will now be described by way of examples. However, the present invention is not restricted to these examples.

Example 1

As aromatic diamine components, 80 mol % of 2-chloro-p-phenylenediamine and 20 mol % of 4,4'-diaminodiphenyl ether were dissolved in N-methylpyrrolidone (NMP). To this solution, 100 mol % of 2-chloroterephthalic chloride was added and the mixture was stirred for 2 hours to complete polymerization. The resultant was neutralized with lithium hydroxide to obtain an aromatic polyamide solution having a polymer concentration of 10% by weight and a viscosity of 3000 poise. To this solution, dry silica particles having a primary particle size of 16 nm and a secondary particle size of 0.2 µm were added in an amount of 2 wt % based on the weight of the polymer.

After filtering the obtained polymer solution through a 5 µm cut filter, the solution was cast onto a belt having a frequency of surface defects with a diameter of not less than 30 µm of 0.006 defects/mm$^2$. The solvent was evaporated by heating the solution with hot air at 180° C. for 2 minutes, and the film which acquired self-supporting property was continuously peeled off from the belt. The film was then introduced into water bath having a gradient of concentration of NMP to extract with water the residual solvent and the inorganic salts generated by neutralization. The film was then dried and heat set in a tenter to obtain an aromatic polyamide film having a thickness of 6 µm. During this process, the film was stretched in the longitudinal and transverse directions at stretching ratios of 1.2 times and 1.3 times the original lengths, respectively. The film was then dried and heat set at 280° C. for 1.5 minutes and then slowly cooled at a rate of 20° C./second.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 40 protrusions/100 cm$^2$. The tensile Young's moduli E20 at 20° C. in the longitudinal and transverse directions were both 1250 kg/mm$^2$, and the ratios E100/E20 of the tensile Young's modulus E100 at 100° C. to the tensile Young's modulus E20 at 20° C. were both 0.72 in the longitudinal and transverse directions. The dimensional change of this film under a load of 1 kg/mm$^2$ was 0.6%.

The running property and electro-magnetic conversion characteristics of this film were measured, both of which were good.

Example 2

After filtering the same polymer as in Example 1 through a 5 µm cut filter, the solution was cast onto a belt having a frequency of surface defects with a diameter of not less than 30 µm of 0.002 defects/mm$^2$. The solvent was evaporated by heating the solution with hot air at 200° C. for 2 minutes, and the film which acquired self-supporting property was continuously peeled off from the belt. Thereafter, the same procedure as in Example 1 was followed to obtain an aromatic polyamide film having a thickness of 5 µm.

The numbers of surface large protrusions H2 and H1 in the surface which did not contact the belt were 30 protrusions/100 cm$^2$ and 60 protrusions/100 cm$^2$, respectively, and the number of surface large protrusions H3 in the surface which contacted the belt was 5 protrusions/100 cm$^2$. The tensile Young's moduli E20 at 20° C. in the longitudinal and transverse directions were both 1280 kg/mm$^2$, and the ratios E100/E20 of the tensile Young's modulus E100 at 100° C. to the tensile Young's modulus E20 at 20° C. were both 0.70 in the longitudinal and transverse directions. The dimensional change of this film under a load of 1 kg/mm$^2$ was 0.6%.

The running property and electro-magnetic conversion characteristics of this film were measured, both of which were good.

Example 3

The same procedure as in Example 1 was repeated except that the stretching of the film was carried out at a stretching ratio of 1.1 times the original length in the longitudinal direction and at 1.45 times the original length in the transverse direction to obtain an aromatic polyamide film having a thickness of 5 µm.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 40 protrusions/100 cm$^2$. The tensile Young's moduli at 20° C. in the longitudinal and transverse directions were 900 kg/mm$^2$ and 1640 kg/mm$^2$, respectively, and the ratios E100/E20 of the tensile Young's modulus E100 at 100° C. to the tensile Young's modulus at 20° C. in the longitudinal and transverse directions were 0.75 and 0.70, respectively. The dimensional change of this film under a load of 1 kg/mm$^2$ was 0.6%.

The running property and electro-magnetic conversion characteristics of this film were measured, both of which were good.

Example 4

As aromatic diamine components, 60 mol % of p-phenylenediamine and 40 mol % of 4,4'-diaminodiphenyl ether were dissolved in NMP. To this solution, 100 mol % of 2-chloroterephthalic chloride was added and the mixture was stirred for 2 hours to complete polymerization. The resultant was neutralized with lithium hydroxide to obtain an aromatic polyamide solution having a polymer concentration of 10% by weight and a viscosity of 3000 poise. To this solution, dry silica particles having a primary particle size of 16 nm and a secondary particle size of 0.2 µm were added in an amount of 2 wt % based on the weight of the polymer.

After filtering this polymer solution through a 5 µm cut filter, the solution was cast onto a belt having a frequency of surface defects with a diameter of not less than 30 µm of 0.015 defects/mm$^2$. The solvent was evaporated by heating the solution with hot air at 180° C. for 2 minutes, and the film which acquired self-supporting property was continuously peeled off from the belt. Thereafter, the same procedure as in Example 1 was followed to obtain an aromatic polyamide film having a thickness of 5 µm.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 75 protrusions/100 cm$^2$. The tensile Young's moduli E20 at 20° C. in the longitudinal and transverse directions were both 920 kg/mm$^2$, and the ratios E100/E20 of the tensile Young's modulus E100 at 100° C. to the tensile Young's modulus at 20° C. were both 0.57 in the longitudinal and transverse directions. The dimensional change of this film under a load of 1 kg/mm$^2$ was 1.1%.

The running property and electro-magnetic conversion characteristics of this film were measured, both of which were good.

Example 5

As aromatic diamine components, 100 mol % of 2-chloro-p-phenylenediamine was dissolved in NMP. To this solution, 100 mol % of 3,3', 4,4'-biphenyltetracarboxylic dianhydride was added to carry out polymerization, thereby obtaining a polyamic acid solution. To this solution, dry silica particles having a primary particle size of 16 nm were added in an amount of 2 wt % based on the weight of the polymer.

After filtering this polymer solution through a 5 µm cut filter, the solution was cast onto a belt having a frequency of surface defects with a diameter of not less than 30 µm of 0.006 defects/mm$^2$. The solution was dried with hot air at 150° C. until the film acquired self-supporting property and the film was continuously peeled off from the belt. Thereafter, the film was heat set in a tenter at 420° C. and slowly cooled at a rate of 20° C./second. The stretching ratios were 1.1 times the original length in both the longitudinal and transverse directions. The thickness of the obtained film was 6 µm.

The numbers of surface large protrusions H2 and H1 in the surface which did not contact the belt were 15 protrusions/100 cm$^2$ and 40 protrusions/100 cm$^2$, respectively, and the number of surface large protrusions H3 in the surface which contacted the belt was 55 protrusions/100 cm$^2$. The tensile Young's moduli E20 at 20° C. in the longitudinal and transverse directions were both 880 kg/mm$^2$, and the ratios E100/E20 of the tensile Young's modulus at 100° C. to the tensile Young's modulus at 20° C. were both 0.85 in the longitudinal and transverse directions. The dimensional change of this film under a load of 1 kg/mm$^2$ was 0.6%.

The running property and electro-magnetic conversion characteristics of this film were measured, both of which were good.

Comparative Example 1

After filtering the same polymer as in Example 1 through a 5 µm cut filter, the solution was cast onto a belt having a frequency of surface defects with a diameter of not less than 30 µm of 0.006 defects/mm$^2$. The solvent was evaporated by heating the solution with hot air at 230° C., and the film which acquired self-supporting property was continuously peeled off from the belt. Thereafter, the same procedure as in Example 1 was followed to obtain an aromatic polyamide film having a thickness of 5 µm.

The numbers of surface large protrusions H2 and H1 in the surface which did not contact the belt were 70 protrusions/100 cm$^2$ and 130 protrusions/100 cm$^2$, respectively, and the number of surface large protrusions H3 in the surface which contacted the belt was 40 protrusions/100 cm$^2$. The tensile Young's moduli E20 at 20° C. in the longitudinal and transverse directions were both 1230 kg/mm$^2$, and the ratios E100/E20 of the tensile Young's modulus E100 at 100° C. to the tensile Young's modulus E20 at 20° C. were both 0.69 in the longitudinal and transverse directions. The dimensional change of this film under a load of 1 kg/mm$^2$ was 0.6%.

Although the running property of this film was good, the electro-magnetic conversion characteristics were bad because it had a number of large protrusions.

Comparative Example 2

After filtering the same polymer as in Example 1 through a 5 µm cut filter, the solution was cast onto a belt having a frequency of surface defects with a diameter of not less than 30 µm of 0.0001 defects/mm$^2$. Thereafter, the same procedure as in Example 1 was followed to obtain an aromatic polyamide film having a thickness of 5 µm.

The numbers of surface large protrusions H2 and H1 in the surface which did not contact the belt were 15 protrusions/100 cm$^2$ and 35 protrusions/100 cm$^2$, respectively, and the number of surface large protrusions H3 in the surface which contacted the belt was 1 protrusion/100 cm$^2$. The tensile Young's moduli E20 at 20° C. in the longitudinal and transverse directions were both 1250 kg/mm$^2$, and the ratios E100/E20 of the tensile Young's modulus E100 at 100° C. to the tensile Young's modulus E20 at 20° C. were both 0.72 in the longitudinal and transverse directions. The dimensional change of this film under a load of 1 kg/mm$^2$ was 0.6%.

Although the electro-magnetic conversion characteristics were good, the running property of this film was bad.

Comparative Example 3

After filtering the same polymer as in Example 1 through a 5 µm cut filter, the solution was cast onto a belt having a frequency of surface defects with a diameter of not less than 30 µm of 0.025 defects/mm$^2$. Thereafter, the same procedure as in Example 1 was followed to obtain an aromatic polyamide film having a thickness of 5 µm.

The numbers of surface large protrusions H2 and H1 in the surface which did not contact the belt were 20 protrusions/100 cm$^2$ and 50 protrusions/100 cm$^2$, respectively, and the number of surface large protrusions H3 in the surface which contacted the belt was 160 protrusions/100 cm$^2$. The tensile Young's moduli E20 at 20° C. in the longitudinal and transverse directions were both 1250 kg/mm$^2$, and the ratios E100/E20 of the tensile Young's modulus E100 at 100° C. to the tensile Young's modulus E20 at 20° C. were both 0.72 in the longitudinal and transverse directions. The dimensional change of this film under a load of 1 kg/mm$^2$ was 0.6%.

Although the running property of this film was good, the electro-magnetic conversion characteristics were bad.

Comparative Example 4

As aromatic diamine components, 50 mol % of p-phenylenediamine and 50 mol % of 4,4-diaminodiphenyl ether were dissolved in NMP. To this solution, 100 mol % of pyromellitic anhydride was added to carry out polymerization, thereby obtaining a polyamic acid solution. To this solution, dry silica particles having a primary particle size of 16 nm were added in an amount of 2 wt % based on the weight of the polymer.

After filtering this polymer solution through a 5 µm cut filter, the solution was cast onto a belt having a frequency of surface defects with a diameter of not less than 30 µm of 0.006 defects/mm$^2$. The solution was dried with hot air at 180° C. until the film acquired self-supporting property and the film was continuously peeled off from the belt. Thereafter, the film was heat set in a tenter at 420° C. and slowly cooled at a rate of 20° C./second. The stretching ratios were 1.1 times the original length in both the longitudinal and transverse directions. The thickness of the obtained film was 8 µm.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 50 protrusions/100 cm$^2$. The tensile Young's moduli E20 at 20° C. in the longitudinal and transverse directions were 420 kg/mm$^2$ and 430 kg/mm$^2$, respectively, and the film had the maximum tensile Young's modulus in the direction shifted clockwise by 35° from the transverse direction. The ratios E100/E20 of the tensile Young's modulus E100 at 100° C. to the tensile Young's modulus E20 at 20° C. in the longitudinal and transverse directions, as well as in the direction shifted clockwise by 35° from the transverse direction, were 0.80. The dimensional change of this film under a load of 1 kg/mm$^2$ was 0.6%.

Although the electro-magnetic conversion characteristics of this film were good, the running property was poor.

Comparative Example 5

As aromatic diamine components, 100 mol % of 4,4-diaminodiphenylmethane was dissolved in N-methylpyrrolidone (NMP). To this solution, 50 mol % of isophthalic chloride and 50 mol % of terephthalic chloride were added and the mixture was stirred for 2 hours to complete polymerization. The resultant was neutralized with lithium hydroxide to obtain an aromatic polyamide solution having a polymer concentration of 10% by weight and a viscosity of 3000 poise. To this solution, dry silica particles having a primary particle size of 16 nm and a secondary particle size of 0.2 μm were added in an amount of 2 wt. % based on the weight of the polymer.

Using this polymer solution, an aromatic polyamide film having a thickness of 6 μm was obtained in the same manner as in Example 1.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 40 protrusion/100 cm$^2$. The tensile Young's moduli E20 at 20° C. in the longitudinal and transverse directions were both 900 kg/mm$^2$, and the ratios E100/E20 of the tensile Young's modulus E100 at 100° C. to the tensile Young's modulus E20 at 20° C. were both 0.46 in the longitudinal and transverse directions. The dimensional change of this film under a load of 1 kg/mm$^2$ was 2.2%.

Although the running property of this film was good, the electro-magnetic conversion characteristics were bad.

INDUSTRIAL FIELD

The present invention provides a magnetic recording medium having excellent running property, durability and output characteristics even under severe conditions such as high temperature and repeated running, by exploiting the excellent heat resistance and high rigidity of aromatic polyamides or aromatic polyimides and by defining the surface characteristics.

TABLE 1

| | Number of Surface Large Protrusions (protrusions/100 cm$^2$) | | | Tensile Young's Modulus E20 (20° C.) | | Dimensional Change | Electro-magnetic Conversion Characteristics | Running Property |
|---|---|---|---|---|---|---|---|---|
| | H1 | H2 | H3 | (kg/mm$^2$) | E100/E20 | (%) | | |
| Example 1 | 45 | 20 | 40 | 1250 | 0.72 | 0.6 | O | O |
| Example 2 | 60 | 30 | 5 | 1280 | 0.70 | 0.6 | O | O |
| Example 3 | 45 | 20 | 40 | 900 (MD) 1640 (TD) | 0.75 (MD) 0.70 (TD) | 0.6 | O | O |
| Example 4 | 45 | 20 | 75 | 920 | 0.57 | 1.1 | O | O |
| Example 5 | 40 | 15 | 55 | 880 | 0.85 | 0.6 | O | O |
| Comparative Example 1 | 130 | 70 | 40 | 1230 | 0.69 | 0.6 | X | O |
| Comparative Example 2 | 35 | 15 | 1 | 1250 | 0.72 | 0.6 | O | X |
| Comparative Example 3 | 50 | 20 | 160 | 1250 | 0.72 | 0.6 | X | O |
| Comparative Example 4 | 45 | 20 | 50 | 450 | 0.80 | 0.6 | O | X |
| Comparative Example 5 | 45 | 20 | 40 | 900 | 0.46 | 2.2 | X | O |

We claim:

1. A magnetic recording medium comprising a base film made of an aromatic polyamide or an aromatic polyimide, and a magnetic recording layer formed on one surface of said base film, the number of protrusions H2 on the surface of said base film on which said magnetic layer is to be formed and the number of protrusions H3 on the surface of the side of said base film opposite to said surface on which said magnetic layer is to be formed satisfying the relationship of:

H2≦50 protrusions/100 cm$^2$

2≦H3≦100 protrusions/100cm$^2$, the tensile Young's modulus E20 at 20° C. in at least one direction and the tensile Young's modulus E100 at 100° C. in the same direction satisfying the relationships of:

E20≧800 kg/mm$^2$ 0.5<E100/E20.

2. The magnetic recording medium according to claim 1, wherein the number of protrusions H1 on said surface of said base film on which said magnetic layer is to be formed satisfies the relationship of:

H1<100 protrusions/100 cm$^2$.

3. The magnetic recording medium according to claim 1 or 2, wherein the dimensional change of said base film after applying a load of 1 kg per 1 mm$^2$ at 100° C. for 10 minutes is not more than 2%.

4. The magnetic recording medium according to claim 1, wherein H2 satisfies the relationship of:

H2≦30.

5. The magnetic recording medium according to claim 1, wherein H2 satisfies the relationship of:

H2≦20.

6. The magnetic recording medium according to claim 1, wherein H3 satisfies the relationship of:

2≦H3≦70.

7. The magnetic recording medium according to claim 1, wherein H3 satisfies the relationship of:

2<H3<50.

* * * * *

UNITED STATES PATENT AND TRADEMARK OFFICE
CERTIFICATE OF CORRECTION

PATENT NO. : 5,686,166
DATED : November 11, 1997
INVENTOR(S) : Akimitsu Tsukuda, et al It is certified that error appears in the above-indentified patent and that said Letters Patent is hereby corrected as shown below:

Column 2, line 19, please delete "to".

Column 7, line 39, please change "less" second occurrence to --more--.

Signed and Sealed this

Twenty-fourth Day of February, 1998

Attest:

BRUCE LEHMAN

*Attesting Officer*     *Commissioner of Patents and Trademarks*